(12) United States Patent
Balasubramanian

(10) Patent No.: US 8,160,000 B2
(45) Date of Patent: Apr. 17, 2012

(54) ACHIEVING POWER SAVINGS THROUGH PACKET GROUPING

(75) Inventor: Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 11/538,400

(22) Filed: Oct. 3, 2006

(65) Prior Publication Data

US 2007/0286222 A1  Dec. 13, 2007

Related U.S. Application Data

(60) Provisional application No. 60/812,396, filed on Jun. 8, 2006.

(51) Int. Cl.
*H04W 4/00* (2009.01)
*H04L 12/28* (2006.01)
*G08C 17/00* (2006.01)
*H04J 3/16* (2006.01)
*H04J 3/14* (2006.01)
*H04B 7/216* (2006.01)
*H04B 7/15* (2006.01)

(52) U.S. Cl. ........ 370/328; 370/412; 370/311; 370/390; 370/468; 370/231; 370/335; 370/392; 455/11.1

(58) Field of Classification Search ............. 370/328, 370/412
See application file for complete search history.

(56) References Cited

U.S. PATENT DOCUMENTS

| 6,731,613 | B1 * | 5/2004 | Provance ............. 370/311 |
| 2001/0030943 | A1 * | 10/2001 | Gregg et al. ............. 370/231 |
| 2004/0156391 | A1 * | 8/2004 | Bushnell ............. 370/468 |
| 2004/0264396 | A1 * | 12/2004 | Ginzburg et al. ............. 370/311 |
| 2005/0136833 | A1 * | 6/2005 | Emeott et al. ............. 455/11.1 |
| 2005/0220111 | A1 * | 10/2005 | Mann et al. ............. 370/392 |
| 2006/0029024 | A1 * | 2/2006 | Zeng et al. ............. 370/335 |
| 2006/0140186 | A1 * | 6/2006 | LoGalbo et al. ............. 370/390 |
| 2007/0165610 | A1 * | 7/2007 | Tseng et al. ............. 370/356 |

OTHER PUBLICATIONS

Kravets R et al: "Application-Driven Power Management for Mobile Communication" Wireless Networks, ACM, New York, NY, US, vol. 6, No. 4, Sep. 2000, pp. 263-277, XP001036334 ISSN: 1022-0038.
Sheth A et al: "Adaptive power control and selective radio activation for low-power infrastructure-mode 802.11 LANs" Multimedia Signal Processing, 2002 IEEE Workshop on Dec. 9-11, 2002, Piscataway, NJ, USA, IEEE, May 19, 2003, pp. 812-818, XP010642469 ISBN: 0-7803-7713-3.
Qi Wang et al: "Power & backlog sensitive power control for wireless data in CDMA mobile systems under multipath environments" Vehicular Technology Conference, 2004. VTC2004—Fall. 2004 IEEE 60th Los Angeles, CA, USA Sep. 26-29, 2004, Piscataway, NJ, USA, IEEE, Sep. 26, 2004, pp. 3065-3069, XP010787437 ISBN: 0-7803-8521-7.

(Continued)

*Primary Examiner* — Dwayne Bost
*Assistant Examiner* — Timothy Pham
(74) *Attorney, Agent, or Firm* — Kevin T. Cheatham

(57) ABSTRACT

Power savings may be achieved in a packet-switched system by grouping packets. For example, packets may be queued while a portion of the system is in a suspended state. In some embodiments, power savings are provided in a wireless system to increase talk time. Here, packets may be queued while one or more components such as a radio of the wireless device are in a suspended state.

48 Claims, 10 Drawing Sheets

OTHER PUBLICATIONS

Jean-Lien C Wu et al: "Comparison of power saving schemes for sink nodes in wireless sensor networks" Advanced Information Networking and Applications, 2004. AINA 2004. 18th International Conference on Fukuoka, Japan Mar. 29-31, 2004, Piscataway, NJ, USA, IEEE, vol. 2, Mar. 29, 2004, pp. 339-342, XP010695253 ISBN: 0-7695-2051-0.

Jiao et al: "Adaptive application-driven WLAN power management" Pervasive and Mobile Computing, Elsevier, NL, vol. 3, No. 3, Apr. 13, 2007, pp. 255-275, XP022027018 ISSN: 1574-1192.
International Search Report—PCT/US07/069298, International Search Authority—European Patent Office—Jan. 22, 2008.
Written Opinion—PCT/US2007/069298, International Search Authority, European Patent Office, Jan. 28, 2008.

* cited by examiner

US 8,160,000 B2

ACHIEVING POWER SAVINGS THROUGH PACKET GROUPING

CLAIM OF PRIORITY UNDER 35 U.S.C. §119

This application claims the benefit of and priority to U.S. Provisional Patent Application No. 60/812,396, entitled "ACHIEVING POWER SAVE USING VOIP PACKET COMBINING," filed Jun. 8, 2006, assigned to the assignee hereof, the disclosure of which is hereby incorporated by reference herein.

BACKGROUND

1. Field

This application relates generally to communications, and more specifically, to grouping packets.

2. Background

An electronic device may support one or more communication protocols to transmit information to and/or receive information from other electronic devices. For example, an Ethernet-based protocol facilitates communication between electronic devices over a network that may include various switching/routing components and corresponding interconnection cabling. Conversely, wireless protocols facilitate communication over airwaves to one or more mobile devices.

In many applications it is desirable to conserve power in an electronic communication device. For example, it may be desirable to switch a wired device to a low-power mode when the device has not been used for some period of time. Also, mobile devices traditionally operate on battery power. In this case, reducing the power consumed by the mobile device effectively increases the talk time of the device between recharges of the battery.

A communication protocol such as Wi-Fi (based on the IEEE 802.11-related specifications) may support power savings in a wireless communication device by defining procedures that enable the device to transition to a power save mode when it is not transmitting or receiving data. For example, an access point that provides frames to the device may buffer the frames when the device is in a power save mode. In addition, the protocol may define procedures that enable the device upon transitioning from the power save mode to a normal operating mode to access a communication channel to transmit and/or receive frames.

SUMMARY

A summary of selected aspects of the disclosure follows. For convenience, one or more aspects may be referred to herein simply as "an aspect."

In some aspects power savings are achieved in an apparatus by grouping packets. For example, packets may be queued while an apparatus is in a suspended state. In a suspended state, at least a portion of the apparatus (e.g., components related to media access control and physical layers) may be placed in a reduced-power state. The apparatus may then transition from the suspended state to a wake state (e.g., a normal operating state) to transmit and/or receive a group of queued packets. Advantageously, the group of queued packets may be transmitted and/or received in relatively close succession during a single wake state.

In some aspects packets are queued for a configurable amount of time. For example, packets may be queued for the configurable amount of time when the apparatus is in a suspended state. Once the configurable amount of time has elapsed, the apparatus may transition to a wake state so that any packets that have been queued during the configurable amount of time may be transmitted as a group.

Alternatively, in some aspects a configurable number of packets are queued. For example, when the apparatus is in a suspended state, packets may be queued until the designated number of packets have been queued. At this point, the apparatus may transition to a wake state so that the queued packets may be transmitted as a group.

In some aspects power savings are achieved in a wireless local area network ("WLAN") apparatus by queuing packets when one or more components of the apparatus such as a WLAN radio are in a suspended state. For example, when the WLAN radio is in a suspended state, components providing upper layer operations (e.g., application layer and transmission layer components) may queue uplink packets to be transmitted by the apparatus. In addition, an access point ("AP") may queue frames including downlink packets destined for the apparatus at this time. When the WLAN radio returns to a wake state, the apparatus may transmit a series of frames including the queued uplink packets to the AP. In addition, upon request the AP may transmit the frames including the queued downlink packets to the apparatus one after the other. Advantageously, these uplink and downlink packets may be transmitted during a single wake state of the apparatus. Here, in some aspects the packets may be transmitted via frames sent during one or more 802.1e transmit opportunities ("TX-OPs").

In some aspects data may be bundled by upper layer components. For example, data (e.g., in an RTP packet format) may be queued at an upper layer when the lower layer components are in a suspended state. When the data is ready to be sent, the data (e.g., RTP packet data) may be assembled into a single IP packet. The IP packet may then be sent to the lower layers for transmission via a single frame to the AP once the lower layer components transition to a wake state.

In some aspects power savings are achieved in a wireless local area network ("WLAN") apparatus by queuing packets when one or more components of the apparatus such as a WLAN radio are in a suspended state. For example, when the WLAN radio is in a suspended state, components providing upper layer operations (e.g., application layer and transmission layer components) may queue uplink packets to be transmitted by the apparatus. In addition, an access point ("AP") may queue frames including downlink packets destined for the apparatus at this time. When the WLAN radio returns to a wake state, the apparatus may transmit a series of frames including the queued uplink packets to the AP. In addition, upon request the AP may transmit the frames including the queued downlink packets to the apparatus one after the other. Advantageously, these uplink and downlink packets may be transmitted during a single wake state of the apparatus. Here, in some aspects the packets may be transmitted via frames sent during one or more 802.11e transmission opportunity (TXOP).

In some aspects a method of conserving power in user equipment comprises queuing, in user equipment, a plurality of packets while a transceiver of the user equipment is in a suspended state, and transmitting, by the user equipment, the queued packets during a single wake state of the transceiver.

In some aspects an apparatus comprises a transceiver adapted to transmit queued packets during a single wake state, and a packet queuer adapted to queue a plurality of packets while the transceiver is in a suspended state.

In some aspects an apparatus comprises means for transmitting queued packets during a single wake state, and means for queuing a plurality of packets while the means for transmitting is in a suspended state.

In some aspects a computer-readable medium including instructions stored thereon comprises a first instruction set for queuing, in user equipment, a plurality of packets while a transceiver of the user equipment is in a suspended state, and a second instruction set for transmitting, by the user equipment, the queued packets during a single wake state of the transceiver.

BRIEF DESCRIPTION OF THE DRAWINGS

These and other features, aspects and advantages of the disclosure may be more fully understood when considered with respect to the following detailed description, appended claims and accompanying drawings, wherein:

Figure 1:
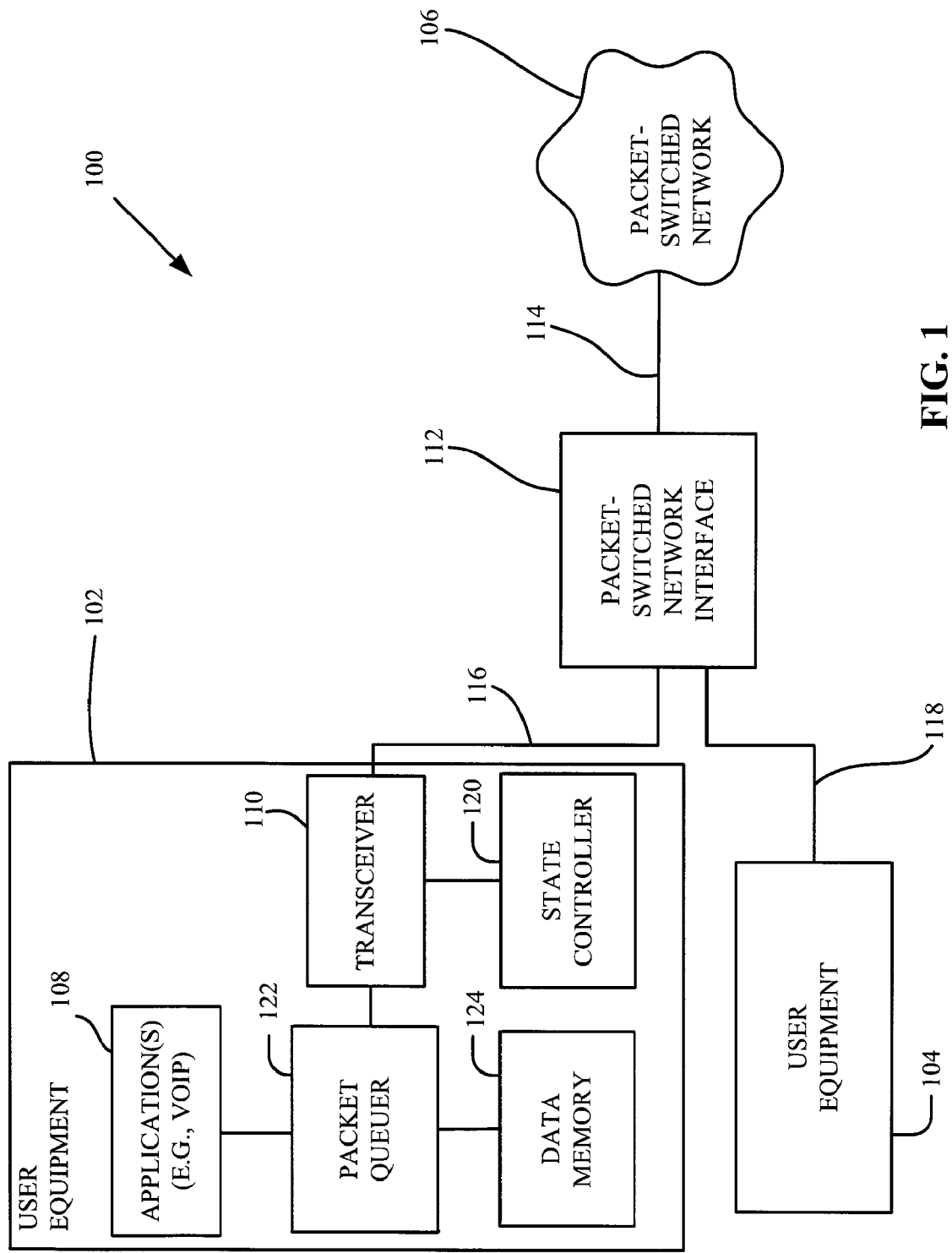
FIG. 1 is a simplified diagram of some aspects of a communication system adapted to transmit and/or receive groups of packets.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined. For example, an apparatus may be implemented and/or a method practiced using any number of the aspects set forth herein. In addition, an apparatus may be implemented and/or a method practiced using other structure and/or functionality in addition to or other than one or more of the aspects set forth herein.

FIG. 1 illustrates certain aspects of a system 100 where one or more user equipment devices (e.g., user equipment 102 and user equipment 104) are coupled to a packet-switched network 106 wherein the system 100 may advantageously save power by grouping packets. The user equipment devices transmit packets to and/or receive packets from each other and/or one or more other devices (not shown) coupled to the packet-switched network 106. In practice, the number of user equipment devices coupled to a packet-switched network 106 will depend on the requirements of the given application. Accordingly, any number (e.g., one, two, three, etc.) of such devices may be coupled to the packet-switched network 106. For convenience, exemplary operations and components of a user equipment device will be discussed with reference to user equipment 102. It should be appreciated, however, that other user equipment (e.g., user equipment 104 and/or other user equipment connected to the network 106) may perform similar operations and/or include similar components. In some cases, user equipment in communication with each other may each advantageously save power by grouping packets. A user equipment ("UE") may also be referred to as an access terminal, a station ("STA"), a wireless communication device, a terminal, a user terminal, a mobile equipment, a subscriber unit, or some other terminology. A UE may be a cellular phone, a smart phone, a cordless phone, a laptop computer, a PDA, a wireless device, a wireless modem, a mobile device, a handset, a handheld device, a satellite radio, a global positioning system, or some other communication device.

In a typical scenario, one or more applications (hereafter referred to, for convenience, as application 108) executing on the user equipment 102 generate and receive data that is formatted into packets when it is transmitted over the network 106. Accordingly, the user equipment 102 includes one or more upper layer components (discussed in more detail below) for handling application data and associated packets. In addition, user equipment 102 includes one or more lower layer components for transmitting and receiving the packets via the network 106. For example, a transceiver 110 may provide a physical layer interface (and, optionally, a data link layer interface) that handles the physical transmission of packets from and to the user equipment 102.

In some applications the user equipment 102 may connect to the network 106 via a packet-switched network interface 112. For example, the user equipment 102 and 104 and the network interface 112 may comprise a sub-network such as a local area network ("LAN"), a personal area network ("PAN"), or some other type of network. Moreover, the network 106 may communicate via one type of network protocol (e.g., Ethernet) over the communication link 114 while the sub-network may communicate via some other protocol (e.g., a wire-based protocol or a wireless-based protocol) over communication links 116 and 118. Accordingly, the network interface 112 may reformat data and perform any other operations needed to send data between a given user equipment device (e.g., user equipment 102 or user equipment 104) and the network 106.

In general, packet flow from or to the user equipment 102 is not absolutely continuous. For example, packet flow may be sporadic (e.g., bursty) or may occur at relatively regular intervals. In either case, a relatively significant amount of time may exist between transmissions and/or receptions of packets. Accordingly, in applications where it is desirable to conserve power it may prove advantageous to effectively turn off one or more of the components of the user equipment 102 when packets are not being transmitted and/or when packets are not to be received. For example, both transmit and receive components may be placed in the power save mode at designated time periods. Alternatively, transmit components and receive components may be independently transitioned between active and power save modes. For example, in applications where the network interface 112 does not buffer downlink traffic, the receiver components may remain in an active mode while the transmit components may be set to a power save mode. In this way some power savings may be achieved while ensuring that downlink traffic is not lost.

In the example of FIG. 1 a state controller 120 controls the state of one or more components of the user equipment 102. For convenience such components may be referred to herein as lower layer components (e.g., the transceiver 110). It should be appreciated, however, based on the teachings herein that the terms lower layer components and transceiver are not limited to physical layer components. Rather, the term may encompass other layer components (e.g., with MAC capabilities) or any other components of the user equipment 102 that may be advantageously suspended (e.g., placed in a power-save mode) while components that generate data and packets and perform the queuing and other related operations remain active (e.g., in a wake state). Accordingly, the term lower layer components may be used herein to refer to components associated with one or more layers in which components may be advantageously placed in, for example, a suspended state (or a powered down state, etc.) while components associated with upper layers remain active to potentially provide packets for the lower layers once to lower layers return to the active state.

In some applications the state controller 120 may switch the transceiver 110 between an active state (e.g., a fully operational state) and a suspended state (e.g., a reduced-power state). In the latter case, one or more of the components (e.g., components that consume a relatively large amount of power) of the transceiver 110 may be disabled or turned off. In some cases, however, some information (e.g., state information, downloaded coding for a digital signal processor, etc.) may be maintained (e.g., stored in a data memory in the transceiver 110) during the suspended state. For example, power may be supplied to at least a portion of the data memory (not shown) in the transceiver 110 during the suspended state. Accordingly, the state controller 120 may be used to place the transceiver 110 in the suspended state as desired to conserve power. During the suspended state, however, packets may not be transmitted by or received by the user equipment 102 over the link 116.

To increase the amount of time the transceiver 110 is in the suspended state (and thereby conserve more power), the user equipment 102 and/or the network interface 112 may be adapted to queue packets while the transceiver 110 is in the suspended state. The equipment 102 and the interface 112 may be adapted to group (e.g., consolidate, bundle, combine, etc.) the queued packets for transmission over the communication link 116 when the transceiver 110 is in the active state. Here, power may be conserved by not transitioning the transceiver 110 from the suspended state to the active state every time a packet has been generated for transmission by the user equipment 102 or every time it is expected that the user equipment 102 will receive a packet. Accordingly, power savings may be achieved by rescheduling the packet traffic into groups of traffic.

As an example, some applications generate a relatively regular stream of packets. To accommodate such an application, the user equipment 102 may be adapted to queue the packets while the transceiver 110 is in a suspended state. For example, the user equipment 102 may include a packet queuer component 122 that facilitates queuing and temporarily storing the packets in a data memory 124. When the transceiver 110 is transitioned to an active state, the queued packets may be provided to the transceiver 110 for transmission to the network 106 (via interface 112).

Similarly, the network interface 112 may be adapted to queue packets destined for the user equipment 102 when the transceiver 110 is in a suspended state. In this case, when the transceiver 110 is transitioned to an active state, the network interface 112 may send the queued packets to the transceiver 110.

In either case, the queued packets may be grouped for transmission over the communication link 116. For example, the transceiver 110 may send queued uplink packets (received from the application 108) over the communication link 116 in succession to the network interface 112. Conversely, in response to a request by the transceiver 110 or some other indication, the network interface 112 may send any of its queued downlink packets to the transceiver 110 in succession over the communication link 116.

Figure 2:
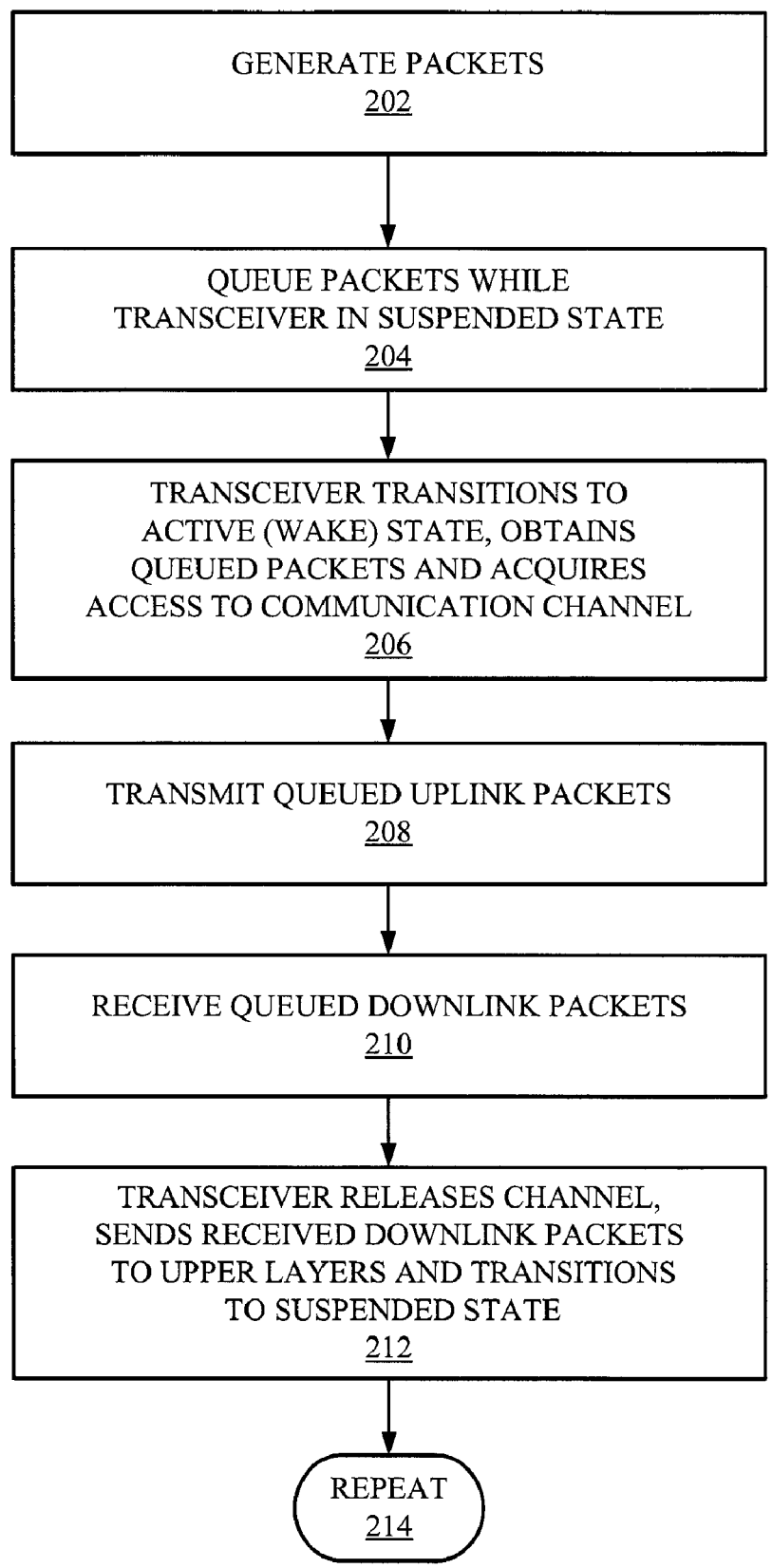
FIG. 2 is a flowchart of some aspects of operations that may be performed to transmit a group of packets and/or receive a group of packets.

The flowchart of FIG. 2 illustrates in some aspects select operations that may be performed to accomplish power savings by queuing packets during a suspended state and grouping the queued packets for transmission during an active state. For convenience, the operations of FIG. 2 may be described in conjunction with specific components described herein. It should be appreciated, however, that these operations may be performed in conjunction with and/or using other components.

As represented by block 202, an application 108 or some other component of the user equipment 102 generates data to be sent over the packet-switched network 106. To facilitate transmission of the data over the network 106, the user equipment 102 includes appropriate upper layer components to assemble and format uplink packets for transmission. For example, the application 108 may comprise a Voice over Internet Protocol ("VoIP") component. In this case, when a VoIP call has been established the application and associated protocol layers may generate VoIP packets on a regular basis (e.g., every 10 ms or 20 ms).

As represented by block 204, when the transceiver 110 and/or any other suitable component of the user equipment 102 is in a suspended state the packets generated at block 202 may be queued. Queuing of packets may comprise, for example, simply storing the packets in some manner and/or referencing where the packet information was stored when it was generated, copied or moved. Thus, the packets are not necessarily stored in any particular sequence. As is discussed in more detail below, the packets may be queued for configurable amount of time. In this case, the number of packets in the queue after the configurable amount of time has elapsed will depend, in part, on the rate at which packets are generated and the point in time at which the configurable amount of time commenced. Alternatively, a configurable number of packets may be queued at block 204.

As represented by block 206, once the configurable amount of time has elapsed or the configurable number of packets have been queued, the transceiver 110 transitions to an active (e.g., wake) state. The transceiver 110 may thus obtain queued packets from the upper layers and establish communications with the network interface 112. For example, the transceiver 110 may acquire access to a communication channel as represented by communication link 116.

As represented by block 208, the transceiver 110 then transmits the queued uplink packets over the communication link 116. Advantageously, the queued packets may be grouped for transmission such that all of the packets are transmitted during a single wake state of the transceiver 110.

For example, as discussed above the transceiver 110 may send the queued packets in relative close succession (e.g., back-to-back) over the communication link 116.

As represented by block 210, during the same single wake state the transceiver 110 also receives any downlink packets queued in the network interface 112. For example, the network interface 112 may use the receipt of an uplink packet as a trigger to transmit any downlink packets in its queue. Alternatively, the transceiver 110 may send a message to the network interface 112 requesting transmission of all queued packets. Again, as discussed above the network interface 112 may send the queued packets in relative close succession over the communication link 116.

As represented by block 212, the transceiver 110 may then release the communication link 116, and forward the received downlink packets to the upper layer components (e.g., application 108) of the user equipment 102. At this point, the transceiver 110 may transition back to the suspended state to conserve power.

As represented by block 214, the above operations may be repeated as necessary to transmit packets from and/or receive packets at the user equipment 102. For example, these operations may be repeated as long as a VoIP call is maintained.

The techniques and components discussed above may be incorporated into a wide variety of user equipment and communication systems. For example, the teachings herein may be incorporated into a wire-based or wireless-based communication system. To more fully illustrate some of the details of such a system, FIGS. 3-7 describe various aspects that may be implemented in a wireless-based communication system that supports VoIP connectivity over a local network. It should be appreciated, however, that the details of FIGS. 3-7 are provided as examples only and that the teachings herein are not limited to the disclosed protocols, structures and functions.

Figure 3:
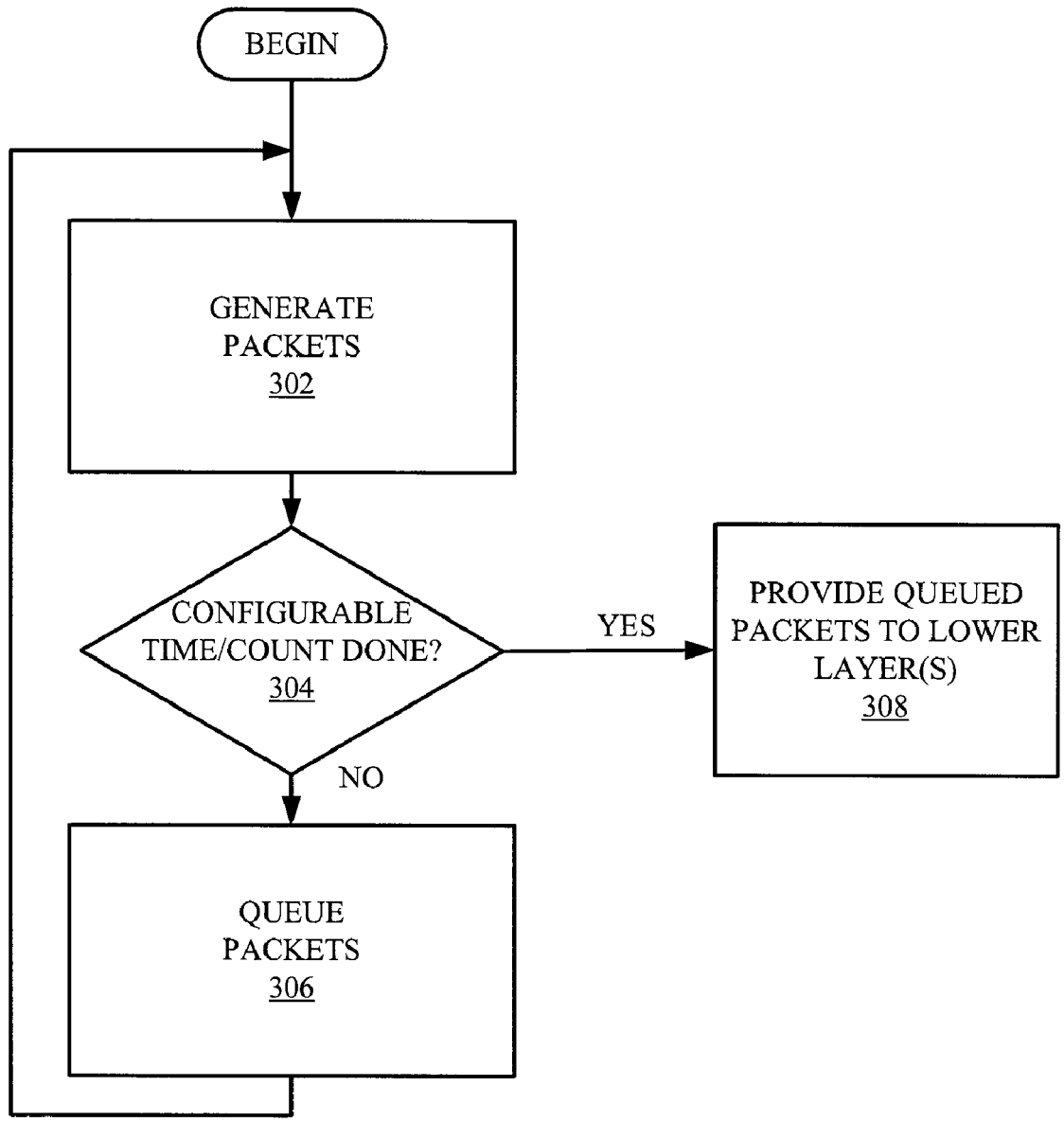
FIG. 3 is a flowchart of some aspects of upper layer operations that may be performed to transmit a group of packets.

FIG. 3 is a simplified flowchart illustrating several operations that may be performed by upper layer components of user equipment. These components may include, for example, application layer, transport layer and network layer components. Accordingly, the operations of FIG. 3 may include uplink operations such as generating data and assembling the data into Internet Protocol ("IP") packets and complementary downlink operations.

Figure 4:
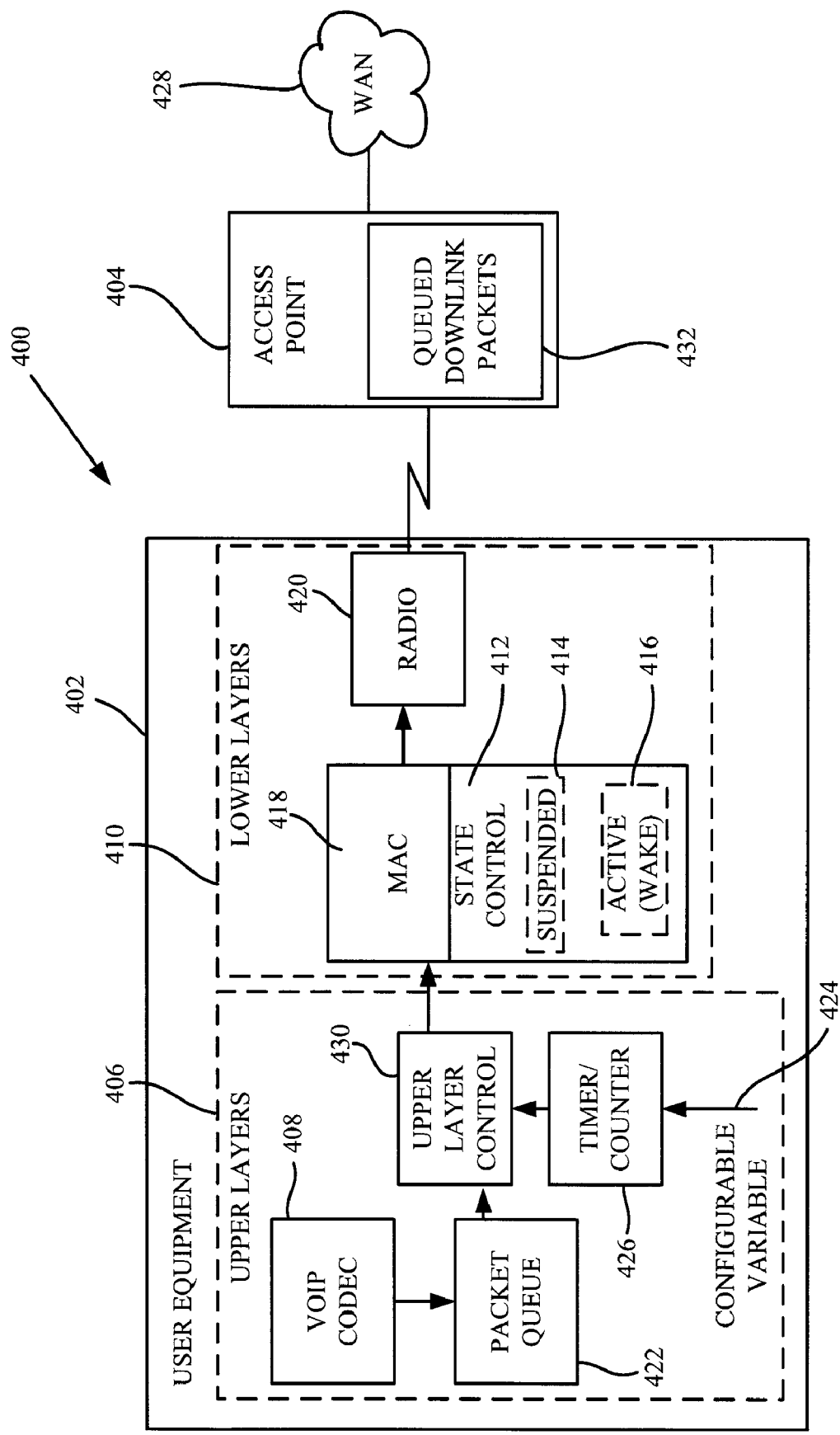
FIG. 4 is a simplified diagram of some aspects of user equipment adapted to transmit a group of packets and/or receive a group of packets via a packet-switched network.
Figure 5:
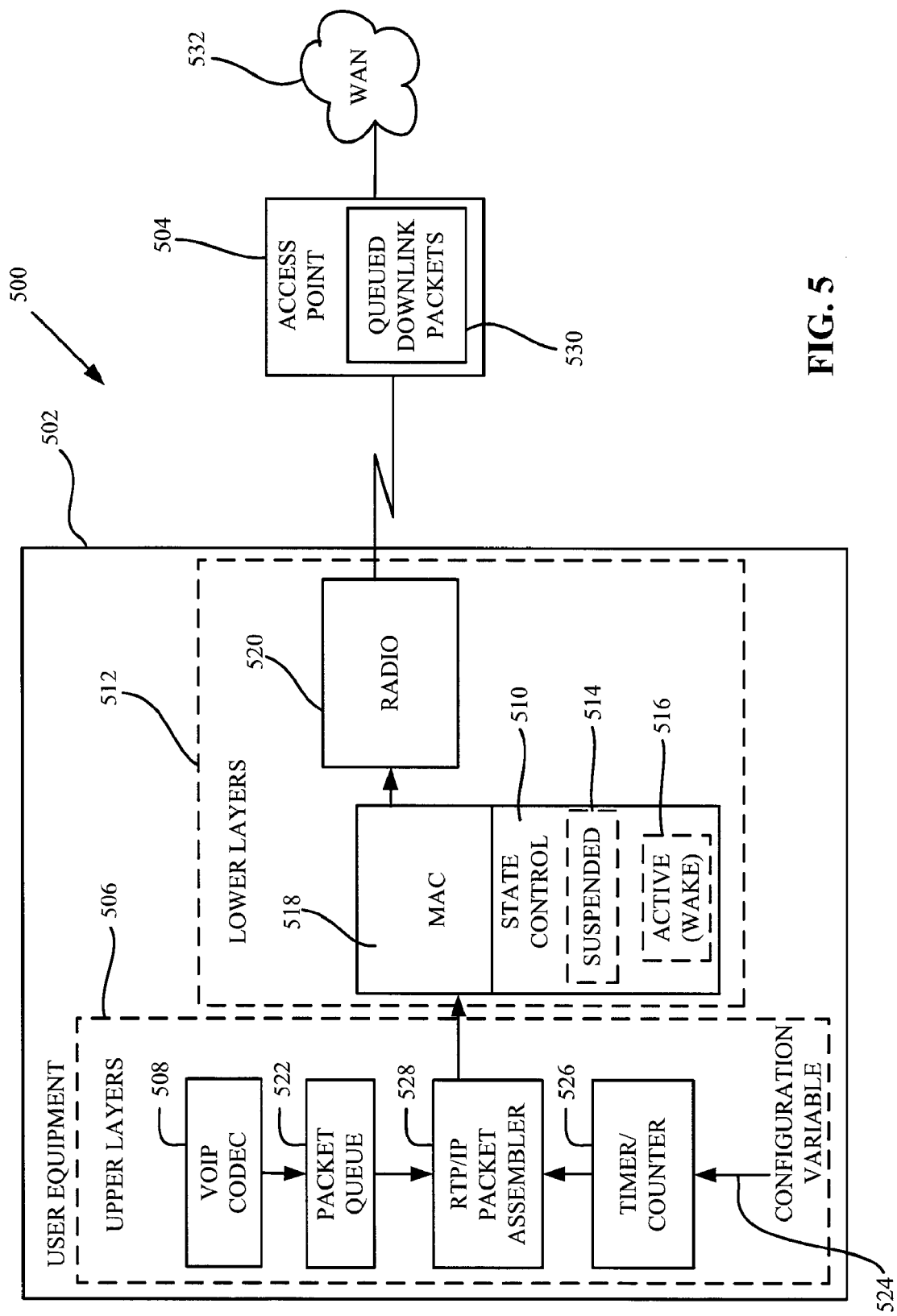
FIG. 5 is a simplified diagram of some aspects of user equipment adapted to transmit and/or receive packets grouped into a single IP packet.

FIGS. 4 and 5 illustrate two different examples of user equipment devices 402 and 502 (e.g., a mobile device), respectively. In FIG. 4 the device 402 sends grouped packets to an access point 404 via successive frames. Here, the operations of FIG. 3 relate, at least in part, to operations of upper layers 406 of the device 402. In FIG. 5 the device 502 sends an IP packet including multiple upper layer packets to an access point 504 via a single frame. Here, the operations of FIG. 3 relate, at least in part, to operations of upper layers 506 of the device 502.

Figure 6:
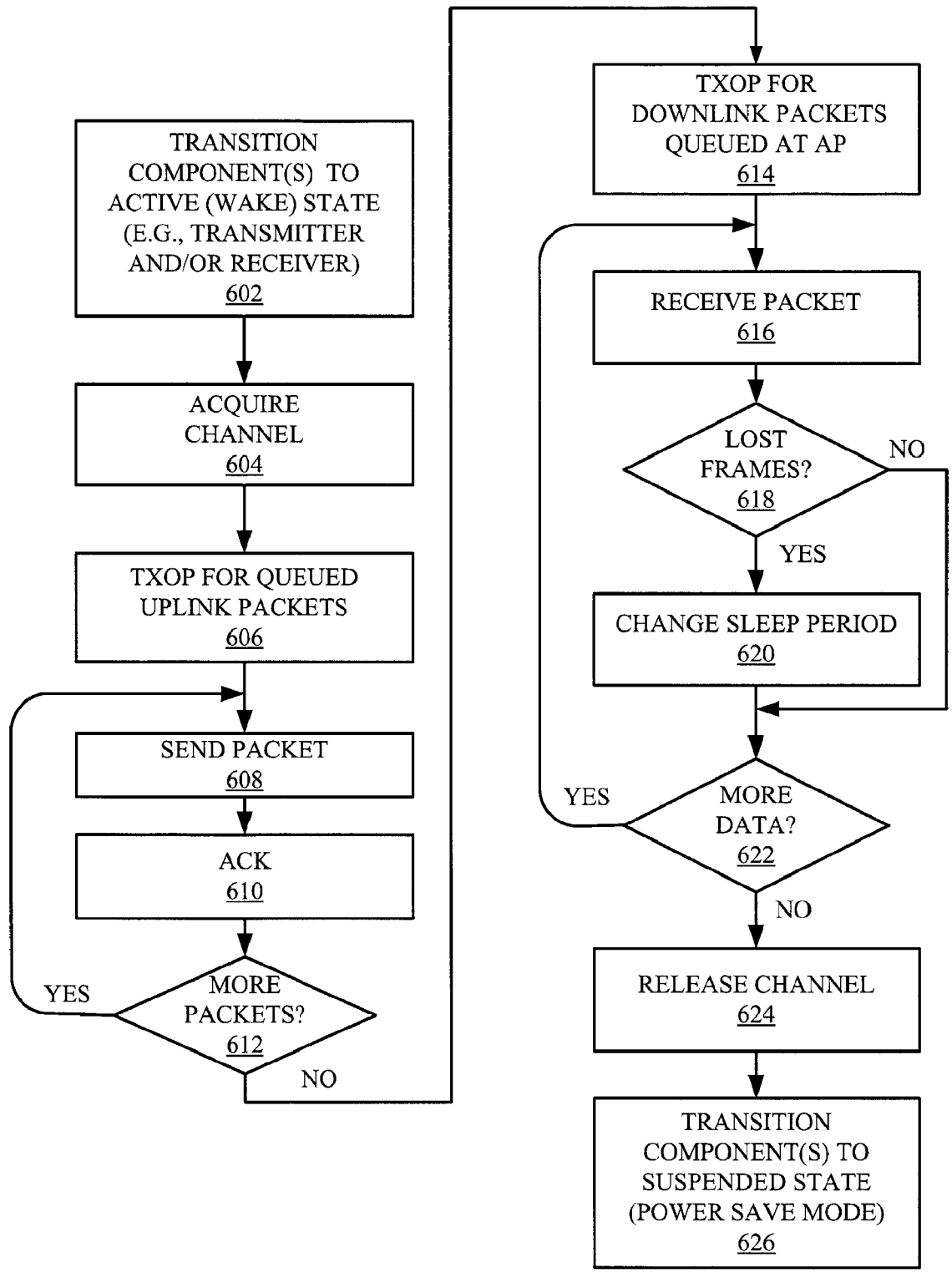
FIG. 6 is a simplified flowchart of some aspects of lower layer operations that may be performed to transmit a group of packets and/or receive a group of packets.
Figure 7:
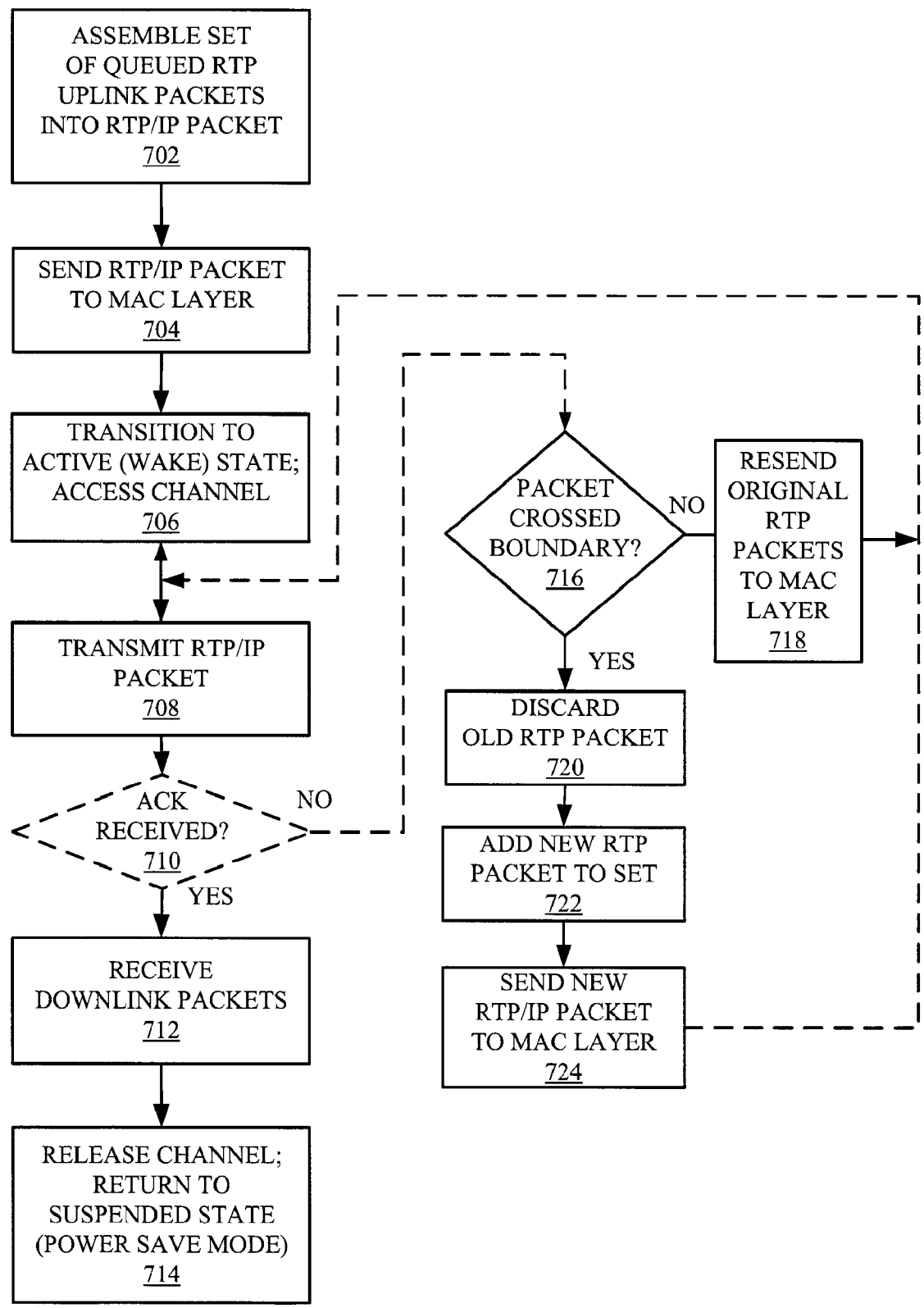
FIG. 7 is a simplified flowchart of some aspects of lower layer operations that may be performed to transmit and/or receive packets grouped into a single IP packet.

FIGS. 6 and 7 illustrate, at least in part, operations that may be performed by lower layer components of the user equipment. In particular, FIG. 6 relates to operations that may be performed by device 402 and FIG. 7 relates to operations that may be performed by device 502. The lower layer components may include, for example, data link layer (e.g., a media access controller) and physical layer (e.g., radio) components. Accordingly, some of the operations of FIGS. 6 and 7 may relate to accessing a channel and transmitting and receiving frames over the channel.

Operations of the devices 402 and 502 will be discussed in turn. Specifically, operations of the components in FIG. 4 will initially be discussed in conjunction with FIGS. 3 and 6. Then, operations of the components of FIG. 5 will be discussed in conjunction with FIGS. 3 and 7.

Referring now to the example of FIG. 3 with reference to FIG. 4, at block 302 a component of the device 402 may generate a stream of packets. For example, when a VoIP call is established a VoIP codec 408 generates a stream of VoIP data. The data generated by the codec 408 (e.g., G711, G723, G729, EVRC, SMV, 4GV, or AMR) is wrapped by one or more components of the upper layers 406 to generate VoIP packets approximately every 10 ms or 20 ms, depending on the codec 408. For example, protocol components of the upper layers 406 may invoke Real-time Transport Protocol ("RTP"), User Datagram Protocol ("UDP") and IP to generate RTP/UDP/IP packets. For convenience these packets may be referred to herein as "RTP/IP packets." Advantageously, the packets may be generated while components associated with the lower layers 410 of the device 402 are in a suspended state.

In a typical WLAN device, a WLAN transceiver may be powered on continuously during a VoIP call or may be repeatedly powered on/off depending on when VoIP packets are generated. In the former case the WLAN transceiver remains ready at all times to transmit or receive packets over the WLAN. In the latter case, the WLAN transceiver may be powered on to transmit a given packet then powered off until the next packet is generated. In addition, the WLAN transceiver may be powered on at certain intervals to receive packets that are expected at those intervals. Here, the transmission time of each packet may depend on the particular WLAN version (e.g., 802.11 a/b/g) and congestion in the network. In addition, there may be a lag time associated with turning the WLAN transceiver on and off each time a packet is transmitted or received.

In contrast, through the use of packet queuing and grouping as taught herein the amount of time a WLAN transceiver is turned on may be reduced and the number of times the WLAN transceiver is turned on and off may be reduced. Specifically, queuing and combining packets may enable the use of a longer period for the suspended state (e.g., power save mode) between packet transmissions and/or receptions. Consequently, a reduction in power consumption may be achieved along with a corresponding increase in talk time.

With reference to FIG. 4, the device 402 includes a state control module 412 for controlling the state of one or more components. For example, the state control module 412 may set the components to a suspended state (e.g., a power save state) 414 or to an active state (e.g., a wake state) 416. In some applications a suspended state may result in one or more of the components of a given module being temporarily disabled or turned off. Here, however, power may still be supplied to other components of the module. For example, to maintain state information during the suspended state, power may be supplied to at least a portion of a data memory (not shown) in the module. It should be appreciated that the state control module 412 may utilize other states in addition to or instead of one or more of the states 414 and 416.

Various components may be controlled by the state control module 412. For example, the state control module 412 may control one or more components in the lower layers 410 of the device 402. In some applications this may involve controlling the state of one or more lower layer control modules (e.g., a media access controller 418) and/or one or more physical layer modules (e.g., a radio 420). It should be appreciated, however, that the state control module 412 may control other components of the device 402 (e.g., one of more components associated with the upper layers 406). In some applications the state control module 412 may independently control different physical components of the device 402. For example, one or more of the lower layer modules may be implemented on a separate integrated circuit or circuit card. In this case, the state control module 412 may control the state of the entire component (e.g., integrated circuit or circuit card).

As represented by blocks 304 and 306, the packets generated at block 302 may be queued in a packet queue 422 (e.g., a data memory) while the components are in the suspended state. For example, packets may be queued for a configurable amount time or a configurable number of packets may be queued at a time. In the former case, a time variable stored in a data memory (not shown) in the device 402 may be provided via a signal 424 to a timer 426. In the latter case, a count variable stored in the data memory may be provided via a signal 424 to a counter 426.

The magnitude of the configurable variable may be selected depending on the amount of packet delay that is acceptable for a given application (e.g., VoIP). In particular, a trade-off may be made between the effect of the delay on system performance and the amount of power savings realized by that delay. Here, the delay may be defined as the time it takes for a packet to be transmitted by the device 402, routed through the access point 404 and a network (e.g., a wide area network 428 such as the Internet), and to an endpoint (not shown) with which the VoIP call is established. In an application where up to 200 ms of total delay is acceptable, a queue delay on the order of 60 ms may be acceptable. In such a case, the time variable may be on the order of 60 ms or the count variable may be on the order of three (e.g., when VoIP packets are generated every 20 ms).

The device 402 may include an upper layer control module 430 that may provide functionality similar to the packet queuer 122 discussed above in conjunction with FIG. 1. As represented by block 308 in FIG. 3, the control module 430 may use an output of the timer/counter 426 to determine when to make the packets in the packet queue 422 available to (e.g., send or provide access to) a component of the lower layers 410 (e.g., the media access controller 418).

In a device 402 where the time variable is set at 60 ms and packets are generated every 20 ms, an average of three packets will be queued in the packet queue 422 every configurable time period. In this case, the control module 430 will, on average, provide three packets for delivery to the lower layers every time the configurable time period elapses. Advantageously, the control module 430 may make these packets available in succession (e.g., where the delay between accessing each packet is significantly less than the inter-packet period of 20 ms) to the lower layers 410. In other words, the uplink packets may be grouped (bundled) when they are sent to the lower layers 410.

Several operations that may be performed by the lower layers 410 will now be discussed in conjunction with FIG. 6. As represented by block 602, in order to process the uplink packets the state control module 412 may transition the lower layer components to an active state (e.g., a wake state). As discussed above, transmitter components and receiver components may be independently transitioned between active and suspended states. Accordingly, this operation may involve powering up a transmitter component and/or a receiver component. Here, a component of the lower layers 410 may obtain a bundle of uplink packets by, for example, retrieving the packets from the higher layers at appropriate times depending on the current radio performance.

As represented by blocks 604 and 606, the lower layer components (e.g., MAC and radio components) may acquire a channel to established communication with the access point 404. For example, in a WLAN that supports 802.11e, the device 402 may issue an 802.11e TXOP to gain control of the channel for a period of time.

Once access to the channel has been gained, the device 402 will send the queued uplink packets to the access point 404 in succession as represented by blocks 608, 610 and 612. In other words, the uplink packets may be grouped (bundled) when they are sent to the access point 404. As represented by block 608, this process may involve sending each packet in a single physical layer transmission (e.g., within a single frame in accordance with the 802.11 standard). The process may then verify that an acknowledgment ("ACK") was received from the access point 404 for each transmitted frame (block 610). Here, each transmission may extend the network allocation vector ("NAV") until all of the packets are delivered or until the maximum TXOP interval elapses.

In conjunction with all but the last of the transmitted frames, the device 402 may inform the access point 404 that at least one more uplink packet will be sent following the current uplink packet. For example, the device 402 may send an appropriate indication (e.g., a "more packet" flag) to the access point 404 via a header in the frame.

During the same active state, the device 402 also may download any downlink packets 432 that have been queued in the access point 404 in applications where receiver components may be set to a suspended state. For example, in such an application as represented by block 614, in a WLAN that supports 802.11e, the device 402 may issue a TXOP to gain control of the channel for a period of time. Advantageously, the TXOP may be used to gain control of the channel relatively quickly as compared to waiting to receive a beacon from the access point 404 to determine whether a traffic indication map ("TIM") in the beacon indicates that there is pending traffic. For example, better performance may be achieved in this case when the suspend interval of 60 ms is significantly shorter than the beacon interval. Alternatively, the device 402 may invoke a Power-Save Poll ("PS Poll") mechanism or an Unscheduled Automatic Power Save Delivery ("UAPSD") mechanism to receive packets from the access point 404.

As represented by blocks 616-622, the access point 404 sends the queued packets to the device 402 over the channel in succession. Thus, the downlink packets may be grouped (bundled) when they are sent to the device 402. This process may involve, for example, sending each packet within a single frame (block 616) and verifying that an acknowledgment was received from the device 402 for each transmitted frame.

As represented by blocks 618 and 620, in some aspects provisions may be made to adjust the length of the time period during which the transceiver remains in the suspended state. For example, the device 402 may encounter a relatively steady loss of frames at fixed intervals in the TXOPs caused by the access point 404 dropping packets due to a shorter than expected buffer time period at the access point 404. For example, the device 402 may be configured for bundling at 60 ms intervals while the access point 404 is configured for bundling at 40 ms intervals. In this case, the access point 404 may discard every frame that exceeds the 40 ms delay. Accordingly, the device 402 may receive frames where every third frame has been dropped. As an example, the access point 404 may receive downlink frames 1, 2, 3, 4, 5, 6, 7, 8, 9, etc., yet only forward downlink frames 2, 3, 5, 6, 8, 9, etc. In the event the device 402 detects such lost frames (block 618) the device 402 may adjust its bundling interval (e.g., sleep period) to match the bundling interval of the access point 404 (block 620). For the situation described above, the device 402 may thus adjust its bundling interval to 40 ms. This may involve, for example, adjusting the time/count signal 424 discussed above in conjunction with blocks 304 and 306.

In conjunction with all but the last of the transmitted frames, the access point 404 may inform the device 402 that at least one more downlink packet will be sent following the current downlink packet. For example, the access point 404 may send an appropriate indication (e.g., a "more data" flag) to the device 402 via a header in the frame. Accordingly, the TXOP may be maintained to continue downloading the downlink packets as long as the "more data" flag is set.

After all of the downlink packets have been received, the device 402 releases the channel (block 624). At this point, state control module 412 may transition the lower level components back to the suspended state (block 626). The above operations are then repeated, as necessary, to repeatedly send and receive packets in groups.

It should be appreciated that for applications that support a symmetric packet flow (e.g., VoIP), on average a comparable number of uplink packets and downlink packets may be downloaded during a given active state. For example, a VoIP codec and associated upper layer components at the endpoint (not shown) may generate downlink VoIP packets at the same rate as the VoIP codec 408 and its associated upper layer components. Accordingly, as a given number of uplink packets from the VoIP codec 408 are queued (e.g., for 60 ms) a similar number of downlink packets originating from the endpoint may be queued at the access point 404. Accordingly, in one aspect the disclosure provides symmetric behavior for uplink and downlink operations. Moreover, this symmetric behavior may be accomplished without affecting (e.g., changing) the implementation of the higher layers.

Referring now to FIG. 5, in this aspect of the disclosure one or more components of the upper layers 506 of the device 502 may generate uplink packets and utilize RTP bundling to group a set of uplink packets in a single RTP/IP packet. Here, when communication (e.g., a call) is established between an application of the device 502 and another application of an endpoint (not shown) connected to network 532 (e.g., the Internet), the applications may negotiate to use an RTP bundling scheme to exchange packets. For example, the use of RTP bundling and the number of RTP packets to be bundled in each IP packet may be specified by the session initiation protocol ("SIP"), for example, using the session description protocol.

Several of the components of FIG. 5 are similar to components described above in conjunction with FIG. 4. Accordingly, many aspects of such similar functionality will not be repeated in the discussion that follows. A description of exemplary upper and lower layer operations of the system 500 of FIG. 5 will be set forth in conjunction with FIG. 3 and FIG. 7, respectively.

As represented by block 302 in FIG. 3 and as shown in FIG. 5, a VoIP codec 508 may generate a stream of data (e.g., VoIP data) as discussed above in conjunction with FIG. 4. In addition, a component of the upper layers 506 may wrap the data using RTP then UDP to generate a packet on the order of every 10 ms or 20 ms. In this case, the generated packet may include VoIP data and associated RTP/UDP header information.

In a similar manner as discussed above in conjunction with FIG. 4, these packets may be generated when one or more components of the device 502 are in a suspended state. Thus, the device 502 may include a state control module 510 that controls the state of one or more components of the device 502. For example, the state control module 510 may transition components of the lower layers 512 of the device 502 between a suspended state 514 and an active state 516. Such lower layer components may include one or more lower layer control components (e.g., a media access controller 518) and/or one or more physical layer components (e.g., radio 520).

As represented by blocks 304 and 306, the packets generated at block 302 may be queued in a packet queue 522 (e.g., a data memory) while one or more of the components of the device 502 are in the suspended state. Packets may be queued until a certain criterion is reached. As discussed above, the criterion may be based on a configuration variable such as a configurable amount of time, a configurable number of packets or some other suitable parameter. Again, the configuration variable may be provided via a signal 524 to a timer/counter 526 that may be used to determine when the criterion has been reached.

As represented by block 308, once the criterion has been reached (e.g., as indicated by an output of timer/counter 526) the queued packets are provided to the lower layer components for additional processing. This operation is further illustrated by blocks 702 and 704 in FIG. 7.

As represented by block 702, initially the queued packets are provided to an IP component. For example, an RTP/IP packet assembler 528 in the device 502 wraps the queued RTP packets into an IP packet. That is, several RTP packets are grouped (bundled) into a single IP packet.

Here, provisions may be made to ensure that the size of the RTP/IP packet is smaller than a maximum transmission unit size. For example, the size of the RTP/IP packet may be smaller than the Request to Send/Clear to Send ("RTS/CTS") threshold and the fragmentation threshold. Here, it may be desirable to avoid creating an RTP/IP packet that would cause a lower layer to invoke RTS/CTS to send the packet or break the packet up to send it via multiple frames. Accordingly, if necessary, one or more of the queued RTP packets may be encapsulated into a subsequent RTP/IP packet rather than the current RTP/IP packet.

As represented by block 704, this RTP/IP packet is sent to a component of the lower layers 512 of the device 502. For example, RTP/IP packet may be sent to the media access controller 518.

As represented by block 706, in order to process the uplink packet the state control module 510 may transition the lower layer components to an active state. In addition, the lower layer components may acquire a channel to establish communication with the access point 504. Again, a mechanism such as TXOP or some other suitable mechanism may be employed to gain control of the channel for a period of time.

As represented by block 708, the device 502 transmits the RTP/IP packet to the access point 504 via the channel. Here, it should be appreciated that the uplink packets are transmitted as a group within the RTP/IP packet. The device 502 may then verify that the RTP/IP packet was successfully received by the access point 504 (block 710).

During the same active state, the device 502 also may download any downlink packets 530 that have been queued in the access point 504 (block 712). As discussed above, the downlink packets 530 may be provided via an RTP/IP packet that utilizes RTP bundling. Accordingly, the downlink packets may be grouped (bundled) when they are sent to the device 502.

After all of the RTP/IP packets including the downlink packets have been received, device 502 releases the channel and the state control module 510 transitions the lower layer components back to the suspended state (block 714). The above operations are repeated, as necessary, to repeatedly send and receive packets in groups.

It should be appreciated that for applications that provide relatively symmetric packet flow, on average a comparable number of uplink packets and downlink packets may be downloaded during a given active state. As discussed above, this may result from packets being generated at the same rate by each endpoint in the packets being subsequently queued for similar amounts of time.

In another aspect, rather than statically grouping packets according to the configurable variable (e.g., every 60 ms) as discussed above, a dynamic approach may be used whereby the process may take into account whether a previously transmitted packet was successfully received. For example, in the event a packet was not successfully received (e.g., there was a frame loss at the MAC layer), the process may either retransmit the original packet bundle or send a modified packet bundle. In the latter case any packets in the packet bundle that are too old may be discarded and replaced with more recent packets. These aspects will now be described in more detail in conjunction with FIG. 8 and blocks 710 and 716-724.

Figure 8:
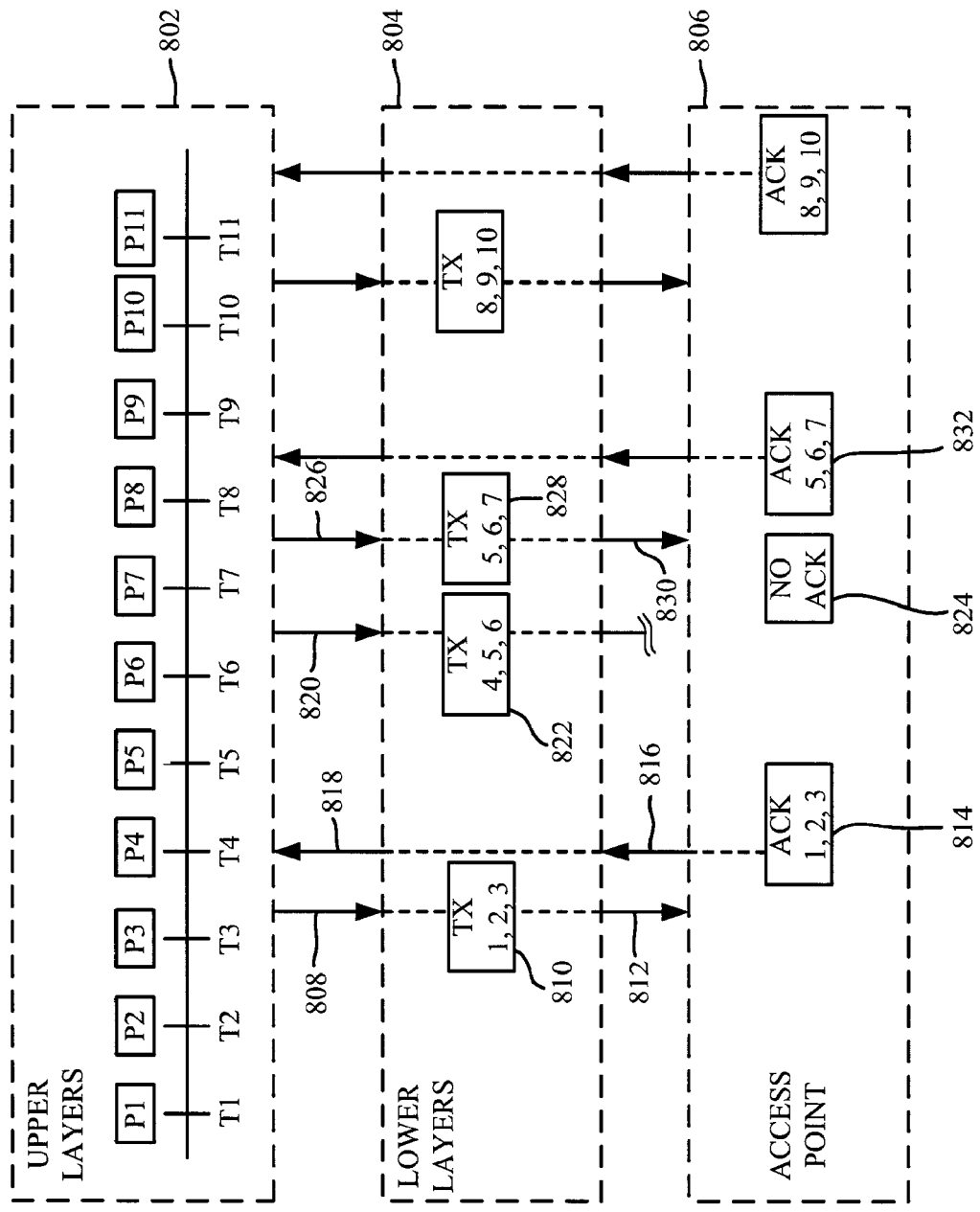
FIG. 8 is a simplified diagram illustrating some aspects of an adjustment of data in and/or timing of an IP packet sent to lower layers.

FIG. 8 illustrates in a simplified manner relative timing between upper layers 802, lower layers 804 and an access point 806. Conceptually, the blocks 802, 804, and 806 may correspond to upper layers 506, lower layers 512 and access point 504, respectively, in FIG. 5.

The block for the upper layers 802 represents that uplink packets (P1, P2, P3, etc.) are generated at regular time intervals (e.g., T1, T2, T3, etc.). A line 808 represents that at some point in time after packets P1, P2 and P3 are generated, the packets P1, P2 and P3 are sent as a group to the lower layers 804. For example, as discussed above the packets P1, P2 and P3 may be encapsulated within a single IP packet. As represented by a block 810 and a line 812, the packets P1, P2 and P3 are transmitted as a group (via the IP packet) to the access point 806. A block 814 and a line 816 represent that the access point 806 sends an acknowledgment (e.g., a MAC layer ACK) of receipt of packets P1, P2 and P3 to the lower layers 804. In addition, a line 818 represents that an acknowledgment (or some other related or suitable indication) is forwarded to the upper layers 802. Accordingly, the upper layers 802 receive an indication as to whether the uplink packets P1, P2, or P3 were successfully received by the access point 806.

A line 820 and a block 822 represent a subsequent transmission of three uplink packets P4, P5 and P6. In this case, however, the uplink packets P4, P5 and P6 are not received by the access point 806. Accordingly, the access point 806 does not transmit an acknowledgment (as represented by block 824).

Referring again to FIG. 7, in the event an acknowledgment was not received at block 712, the upper layers 802 may determine whether it is still feasible to retransmit the original packet (e.g., including P4, P5 and P6). Here, it may not be feasible to retransmit all of the upper packets P4, P5 and P6 if it is determined that any of these packets would not arrive at the destination endpoint before a maximum delay boundary for that particular application has been crossed (block 716). As an example, the maximum allowable delay between the time a packet is generated and the time the packet is received at the destination endpoint may be on the order of 200 ms. Taking into account delays in the network outside of the user equipment, a packet may be deemed to be too old if it is older than, for example, the suspend period (e.g., 60 ms).

Accordingly, in the event the upper layers 802 determine that no acknowledgment (e.g., associated with a data link layer or physical layer) was received from the access point 806 for the frame carrying a given RTP/IP packet, the upper layers 802 may then determine whether one or more of the RTP packets (e.g., packet P4) is more than 60 ms old. In this way, the upper layers 802 may determine whether, upon retransmission, one or more of the packets (e.g., packet P4) would not reach the destination endpoint until after more than 200 ms have elapsed since the packet was originally generated.

As represented by block 718, in the event a maximum delay boundary would not be crossed, the original RTP packets may be retransmitted. This may involve, for example, generating an RTP/IP packet including the original RTP packets and, optionally, new RTP packets. Here, new packets may be included with the original packets in the event any new packets (e.g., P7) have been placed in the queue. Provisions may be made, however, to ensure that the addition of the new RTP packets does not cause the size of the RTP/IP packet to exceed the RTS/CTS and fragmentation thresholds. In other words, the new packets may be transmitted in a subsequent RTP/IP packet to avoid creating a packet that would be sent via RTS/CTS or that would be broken up and sent via multiple frames. As represented by block 708, the upper layers 802 will then send the RTP/IP packet(s) to the lower layers 804 so that the lower layers 804 can transmit the packet(s) to the access point 806.

In the event a maximum delay boundary would be or has been crossed, the upper layers 802 may discard an old RTP packet (block 720) and, if any new RTP packets are in the queue, add a new replacement RTP packet to the set (block 722). Here, the size of the new replacement RTP/IP packet may be restricted to a size smaller than the RTS/CTS and fragmentation thresholds. Again, it may be desirable to avoid creating a new packet that would be sent via RTS/CTS or that would be broken up for transmission via multiple frames.

An example of the above operation is represented in FIG. 8 by a line 826 and a block 828. These representations illustrate that the upper layers 802 have discarded the packet P4 and have generated a new packet set including packets P5, P6 and P7 that is subsequently sent to the lower layers 804 (block 724). As represented by a line 830 and the block 708 (FIG. 7), the lower layers 804 then transmit the new RTP/IP packet to the access point 806.

FIG. 8 further illustrates that once this new packet 828 is acknowledged (block 832), the bundling of packets may continue with the timing adjusted due to the transmission of the packet 828 at a time that did not coincide with the original time interval (e.g., a 60 ms time interval ending shortly after at time T3). For example, the new packet 828 may have been sent shortly after time T7 (approximately 20 ms after the time the packet including P4, P5 and P6 was sent). Accordingly, the timing of any timers or the count of any counters that are used to determine when to transmit packets may be adjusted accordingly.

In view of the above it should be appreciated that numerous advantages may be achieved using the teachings herein. Combining packets may allow for a longer period of sleep (e.g., time in power save mode) as compared to waking up every 10 ms or 20 ms and remaining in an active state to complete the transmissions. For example, in some aspects a transceiver may only be active (e.g., in a wake state) on the order of 5-10 ms of a 60 ms delay period. By "waking" less often to transmit and/or receive packets, the number of transitions between active and suspended states (e.g., turning the transceiver on and off) will be reduced. Accordingly, savings may be achieved through avoidance of the lag time associated with turning the transceiver on and off. Here, the transceiver may use less power since the power consumption associated with some of the lag time may be saved. In addition, the use of a "more packet" flag and a single channel acquisition to complete the transmission of all packets may enable the user equipment to remain in the suspended state for longer periods thereby providing additional power savings.

Furthermore, by requesting packets from the access point after waking to transmit packets, a deterministic way to poll the access point for incoming packets is provided. Here, in applications with relatively symmetric traffic (e.g., VoIP), it is relatively assured that that some downlink packets will be queued in the access point as a result of the preceding suspend time during which the uplink packets were queued. In addition, a subsequent polling requirement may be announced through the use of the "more data" field in the frame transmitted by the access point. Accordingly, it may not be necessary to implement conventional measures that attempt to determine the best times for retrieving downlink packets.

As mentioned above, the teachings herein are applicable to a variety of protocols, user equipment devices and associated network components. Accordingly, user equipment may incorporate various components to obtain connectivity to a network via various wireless platforms such as Wi-Fi, WiMAX or any other wired or wireless platform suitable for carrying packet-switched traffic. In addition, various types of packet traffic other than VoIP may be handled in the above manner. Also, various techniques may be used to queue and group packets. In addition, other techniques may be used to provide multiple states (e.g., reduced power states) and states other than those specifically mentioned herein may be used. The state of components other than those specifically mentioned herein may be controlled to reduce power. Different upper and lower layer protocols and protocol operations may be used to provide desired functionality.

In some embodiments, the teachings herein may be incorporated into a user equipment device that supports multiple communication protocols. For example, a mobile device may be implemented as a multifunctional device providing, for example, email, Internet access, as well as traditional cellular communication. Such a device may be equipped with wide area wireless connectivity, for example, utilizing the following technologies: third generation wireless or cellular systems (3G), WiMAX (e.g., 802.16), and other Wireless Wide Area Network (WWAN) technologies. In addition as discussed above, a device may incorporate IEEE 802.11-based Wireless Local Area Network (WLAN) connectivity. Furthermore, a device may incorporate ultra-wideband (UWB) and/or Bluetooth-based Wireless Personal Area Network (WPAN) local connectivity.

In general, WWAN technologies are distinguished by wide area (ubiquitous) coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

A variety of networks and protocols have been defined in an attempt to provide appropriate functionality to meet the various demands of users and applications. Such disparate networks and protocols may be laborious for a user to switch between and, in many cases, the user is trapped in a network without regard to what might be the optimal network for the user at a given time. Accordingly, in some aspects user equipment may be adapted to provide seamless transitions between networks and/or protocols for optimizing and converging on the best communication protocol for a user.

Referring again to FIG. 1, the system 100 may incorporate a WLAN associated with a wired local area network (LAN). In this case, the network interface 112 may comprise an access point that may be in communication with user equipment 102 and 104 (e.g., 802.11 mobile stations) configured to support WLAN connectivity. The access point may connect via a wired interface 114 to an Ethernet hub or switch for the wired LAN (not shown). The Ethernet hub also may be connected to one or more electronic devices (not shown) that may include personal computers, peripheral devices (e.g., facsimile machines, copiers, printers, scanners, etc.), servers, and the like. The Ethernet hub also may be connected to a router that transmits data packets to a modem (not shown). The modem may transmit data packets to a wide area network (WAN), such as the Internet. The system 100 illustrates a single, relatively simple network configuration. It should be appreciated, however, that many additional configurations of the system 100, including alternative user equipment, are possible. Although the system 100 has been illustrated and described with reference to a LAN, it is possible that the system 100 may utilize other technologies including WWAN and/or WPAN either separately or concurrently.

The system 100 may enable a mobile device (e.g., user equipment 102) to seamlessly switch between an access point currently being utilized by the mobile device to the access point 112 associated with the system 100. A transfer to the access point 112 and to the network supported by the access point 112 may be desirable to provide the user of the mobile device a sought after functionality. Such a transfer may thus be a function of the location of the mobile device and/or the data the user desires to access or upload to the mobile device. By way of example and not limitation, the mobile device may be coupled to one or more of the electronic devices connected to the Ethernet hub to utilize the WWAN and/or WLAN functionality available through the electronic device(s). Such a transition can be user initiated or performed autonomously by the system 100.

Figure 9:
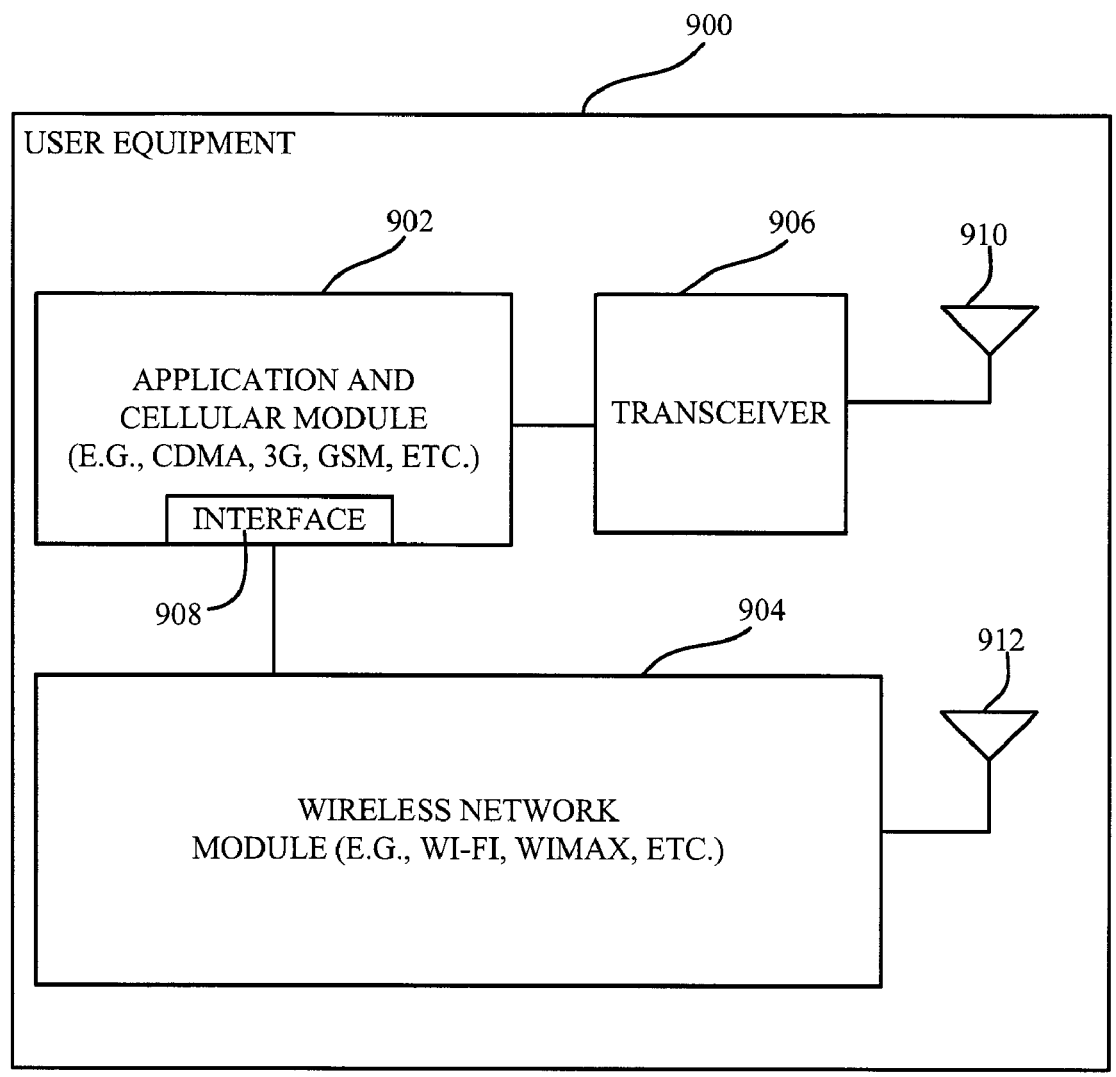
FIG. 9 is a simplified diagram of some aspects of user equipment adapted to transmit and/or receive groups of packets.

Referring now to FIG. 9 various aspects of a user equipment device 900 (e.g., a mobile device) that supports multiple communication protocols will be discussed in more detail. The device 900, also called a mobile station, may in some aspects support WWAN such as Code-Division Multiple Access ("CDMA") and/or 3G technologies such as Wideband Code-Division Multiple Access ("WCDMA"). The device 900 also may support WLAN (e.g., IEEE 802.11) and/or other suitable technologies.

In some aspects, the device 900 may incorporate an application and cellular module 902 and a wireless network module 904. The module 902 may incorporate, for example, user applications and user interface components. In addition, the module 902 may support communication via, for example, a cellular-type technology such as CDMA, GSM, 3G or some other technology. The module 902 may interface with a transceiver 906 coupled to one or more antennas 910 to transmit information to and receive information from a corresponding wide area wireless network. The module 902 also may include an interface 908 for communicating with the wireless network module 904. The interface 908 may comprise, for example, a Secure Digital Input Output ("SDIO") interface or some other suitable interface.

As discussed herein, the wireless network module 904 may support, for example, communications via networks such as packet-switched networks. Such networks may support, for example, Wi-Fi, WiMAX or any other suitable technology. The network module 904 may incorporate an appropriate transceiver and be coupled to one or more antennas 912. Alternatively, the transceiver 906 may incorporate sufficient functionality such that the transceiver 906 is shared by the module 902 and the module 904.

In the configuration shown in FIG. 9, the module 902 may provide upper layer operations for the module 904 as discussed herein. For example, applications that generate packets and associated packet queuing components may be incorporated in the module 902. In this case, the entire module 904 (e.g., a WLAN module incorporating MAC and PHY components) may be placed in a suspended state to conserve power as discussed herein. Thus, when the module 904 is in a suspended state the module 902 may remain in an active state to perform packet generation and queuing, as necessary.

In some aspects, user equipment may provide VoIP phone functionality. In general, VoIP includes the transmission of voice telephone conversation through the Internet and/or through IP networks. As discussed above, in some aspects VoIP connectivity may be provided via a WLAN component. Accordingly, a user may utilize the VoIP capabilities of the device 900 when he/she is in the vicinity of a wireless access point connected to a broadband network that provides VoIP services. In other situations, the device 900 may function as a regular wireless mobile phone while providing communication services.

The device 900 may connect to either the WWAN or the WLAN, or to both simultaneously, based upon one or more criteria that relates to functions of the device 900. Further, process and criteria for switching between each of the networks and/or protocols may also be provided. The criteria may be stored in a data memory of the device 900 and a processor may analyze a network based on the stored criteria.

It should be appreciated based on the teachings herein that user equipment may be implemented in various ways. For example, in some implementations a WWAN functionality component and/or a WLAN functionality component may be included in a processor of the device 900. In some implementations the WWAN functionality and the WLAN functionality may be provided by distinct integrated circuits. In other implementations the WWAN functionality and WLAN functionality may be provided by one or more integrated circuits, processors, ASICs, FPGAs, combinations thereof, or the like including appropriate functionality. The device 900 thus may be equipped with connectivity options for wide area (WWAN) and local area (WLAN and WPAN) to allow a rich combination of services and user experiences.

Figure 10:
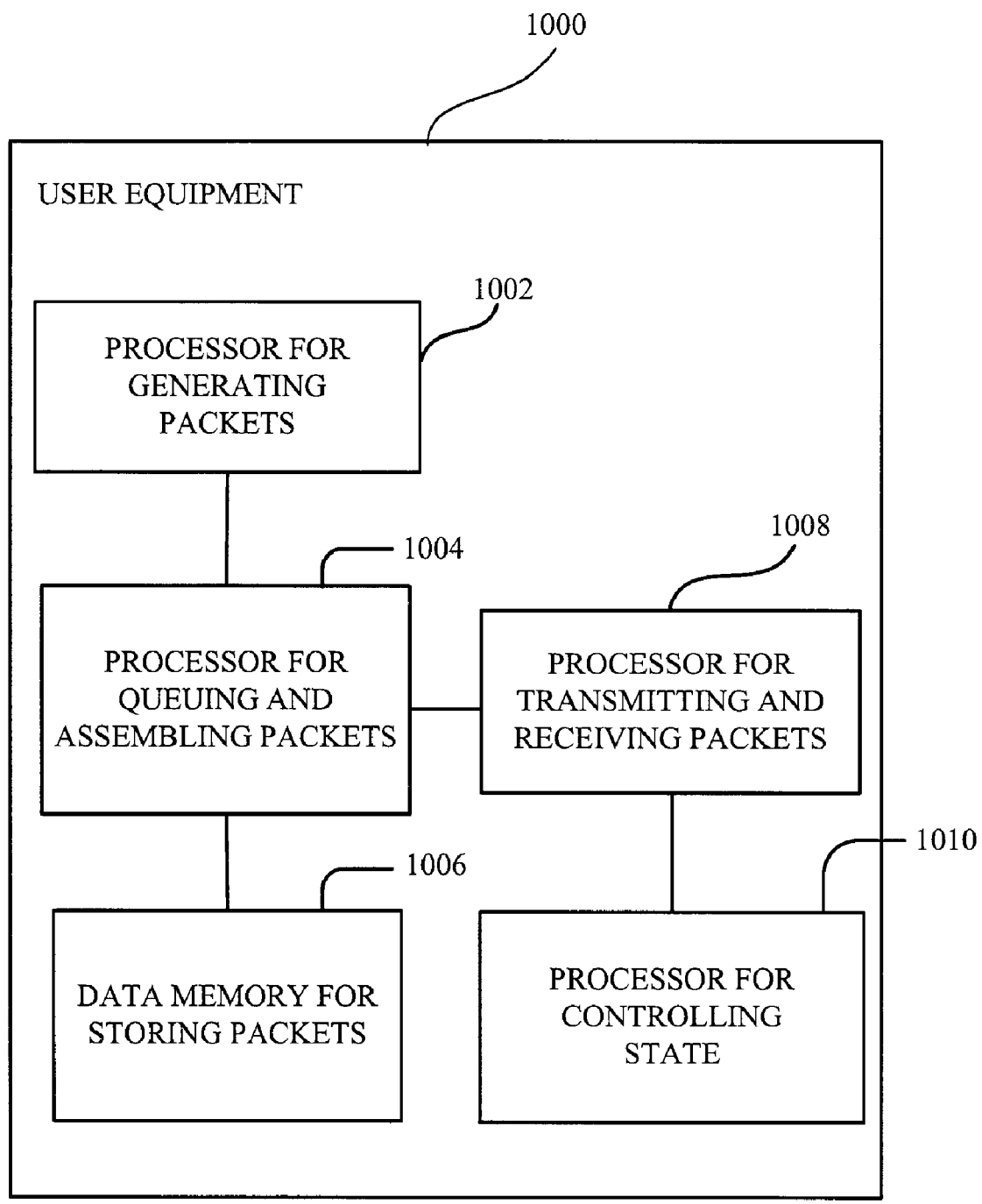
FIG. 10 is a simplified diagram of some aspects of user equipment adapted to transmit and/or receive groups of packets.

Similarly, the components of FIG. 1 and other related components described herein may be implemented in a variety of ways. For example, referring to FIG. 10, user equipment 1000 includes components 1002, 1004, 1006, 1008, and 1010 corresponding to components 108, 122, 124, 110 and 120 of user equipment 102 in FIG. 1. FIG. 10 illustrates that in some aspects these components may be implemented via appropriate processor components. These processor components may in some aspects be implemented, at least in part, using structure as taught herein.

In addition, the components and functions represented by FIG. 10, as well as other components and functions described herein, may be implemented using any suitable means. Such means also may be implemented, at least in part, using corresponding structure as taught herein. For example, in some aspects means for transmitting may comprise a transmitter, means for queuing packets may comprise a packet queuer, means for switching the transceiver from a suspended state to a wake state may comprise a state controller, means for receiving packets may comprise a transceiver, and means for assembling queued packets may comprise a packet queuer. One or more of such means also may be implemented in accordance with one or more of the processor components of FIG. 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware, various forms of program or design code (referred to herein, for convenience, as "software"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory (e.g., a computer-readable medium) such as RAM memory, flash memory, ROM memory, EPROM memory, EEPROM memory, registers, hard disk, a removable disk, a CD-ROM, or any other form of storage medium known in the art. An exemplary storage medium may be coupled to a machine such as, for example, a computer or a processor (which may be referred to herein, for convenience, as a "processor") such that the processor can read information (e.g., software instructions) from, and write information to, the storage medium. An exemplary storage medium may be integral to the processor. The processor and the storage medium may reside in an ASIC. The ASIC may reside in user equipment. In the alternative, the processor and the storage medium may reside as discrete components in user equipment.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of conserving power in a user equipment, comprising:
   queuing a plurality of packets for a configurable amount of time selected to meet an acceptable packet transmission delay for a corresponding traffic type, while a transceiver of the user equipment is in a suspended state;
   grouping the plurality of queued packets, wherein the grouping enables all of the queued packets to be transmitted during a single wake state;
   transmitting the grouped packets during the single wake state of the transceiver to an access point, wherein the user equipment transmits the queued packets during a single acquisition of a channel in a packet-switched network;
   detecting one or more lost packets; and
   in response to the detecting, adjusting the configurable amount of time to match a bundling interval of the access point.

2. The method of claim 1, wherein the packet-switched network comprises a wireless local area network.

3. The method of claim 2, further comprising generating a transmission opportunity (TXOP) to transmit the grouped packets.

4. The method of claim 1, wherein the packets comprise Voice over Internet Protocol (VoIP) packets.

5. The method of claim 1, further comprising indicating in a current transmission of a queued packet that more of the queued packets are to be transmitted in a subsequent transmission during the single wake state.

6. The method of claim 1, further comprising, after the configurable amount of time has elapsed, switching the transceiver from the suspended state to the wake state to transmit the grouped packets.

7. The method of claim 1, further comprising receiving, during the single wake state, packets previously queued for transmission to the user equipment.

8. The method of claim 1, further comprising, in response to a received indication, maintaining the transceiver in the wake state to receive packets queued for transmission to the user equipment.

9. The method of claim 1, wherein the user equipment comprises a mobile device and the transceiver comprises a radio.

10. The method of claim 1, wherein the suspended state is associated with a power save mode.

11. The method of claim 1, wherein the grouping further comprises assembling a set of the queued packets into a Real-time Transport Protocol/Internet Protocol (RTP/IP) packet, wherein transmitting the queued packets comprises transmitting the RTP/IP packet.

12. The method of claim 11, wherein after the configurable amount of time has elapsed, the queued packets are grouped into the RTP/IP packet.

13. The method of claim 11, further comprising selecting packets for transmission from the queued packets in accordance with whether a previous packet was successfully transmitted.

14. The method of claim 11, further comprising:
   removing a queued packet that has crossed a delay boundary from a set of queued packets that was not successfully transmitted;
   adding a new packet to the set of queued packets to form a new set of packets; and
   transmitting the new set of packets during the single wake state of the transceiver.

15. The method of claim 11, wherein transmitting the RTP/IP packet comprises transmitting the RTP/IP packet over a wireless local area network.

16. The method of claim 1, wherein when the transceiver is in the suspended state, transmitter components of the transceiver and receiver components of the transceiver are independently set to either a power save mode or an active mode.

17. The method of claim 1, wherein the plurality of packets are Real-time Transport Protocol (RTP) packets, and grouping comprises bundling multiple RTP packets into a single Internet Protocol (IP) packet.

18. The method of claim 17, further comprising:
   selecting a new amount of time for queuing the plurality of packets in response to a change in traffic type.

19. The method of claim 1, wherein the grouping the plurality of queued packets further comprises consolidating the plurality of queued packets.

20. The method of claim 1, wherein the acceptable packet transmission delay is based on a transmission time of one of the plurality of packets over the packet-switched network.

21. The method of claim 1, wherein the grouping enables all of the queued packets to be transmitted during a single wake state, irrespective of a number the queued packets.

22. An apparatus, comprising:
   a transceiver configured to transmit queued packets during a single wake state to an access point; and
   a packet queuer configured to queue a plurality of packets for a configurable amount of time selected to meet an acceptable packet delay for a corresponding traffic type, while the transceiver is in a suspended state, wherein the packet queuer is configured to combine the plurality of queued packets thus enabling all of the queued packets to be transmitted during a single wake state irrespective of a number of the queued packets, and wherein the transceiver is further configured to:
   transmit the queued packets during a single acquisition of a channel in a packet-switched network;
   detect one or more lost packets; and
   in response to the detecting, adjust the configurable amount of time to match a bundling interval of the access point.

23. The apparatus of claim 22, wherein the packet-switched network comprises a wireless local area network.

24. The apparatus of claim 23, wherein the transceiver is further configured to generate a transmission opportunity (TXOP) to transmit the queued packets.

25. The apparatus of claim 22, wherein the packets comprise Voice over Internet Protocol (VoIP) packets.

26. The apparatus of claim 22, further comprising a state controller configured to, after the configurable amount of time has elapsed, switch the transceiver from the suspended state to the wake state to transmit the queued packets.

27. The apparatus of claim 22, wherein the transceiver is further configured to receive, during the single wake state, packets previously queued for transmission to the apparatus.

28. The apparatus of claim 22, wherein the transceiver further comprises a radio.

29. The apparatus of claim 22, wherein the packet queuer is further configured to assemble a set of the queued packets into a Real-time Transport Protocol/Internet Protocol (RTP/IP)

packet, wherein transmitting the queued packets comprises transmitting the RTP/IP packet.

30. The apparatus of claim 29, wherein after the configurable amount of time has elapsed, the packet queuer is further configured to assemble the queued packets into the RTP/IP packet.

31. An apparatus, comprising:
means for transmitting queued packets during a single wake state to an access point; and
means for queuing a configurable number of packets, the configurable number selected to meet an acceptable packet delay for a corresponding traffic type, while the means for transmitting is in a suspended state, wherein the means for queuing comprises grouping the queued packets thus enabling all of the queued packets to be transmitted during a single wake state, and wherein the means for transmitting:
transmits the queued packets during a single acquisition of a channel in a packet-switched network;
detects one or more lost packets; and
in response to the detecting, adjusts the configurable number according to a bundling interval of the access point.

32. The apparatus of claim 31, wherein the packet-switched network comprises a wireless local area network.

33. The apparatus of claim 32, wherein the means for transmitting generates a transmission opportunity (TXOP) to transmit the queued packets.

34. The apparatus of claim 31, wherein the packets comprise Voice over Internet Protocol (VoIP) packets.

35. The apparatus of claim 31, further comprising means for switching the means for transmitting, after the configurable number of packets have been queued, from the suspended state to the wake state to transmit the queued packets.

36. The apparatus of claim 31, further comprising means for receiving, during the single wake state, packets previously queued for transmission to the apparatus.

37. The apparatus of claim 36, wherein the means for transmitting and the means for receiving comprise a radio.

38. The apparatus of claim 31, further comprising means for assembling a set of the queued packets into a Real-time Transport Protocol/Internet Protocol (RTP/IP) packet, wherein transmitting the queued packets comprises transmitting the RTP/IP packet.

39. The apparatus of claim 38, further comprising means for assembling, after the configurable amount of time has elapsed, the queued packets into the RTP/IP packet.

40. A non-transitory computer-readable medium including instructions stored thereon, comprising:
a first instruction set for queuing, in user equipment, a plurality of packets for a configurable amount of time selected to meet an acceptable packet delay for a corresponding traffic type, while a transceiver of the user equipment is in a suspended state, wherein the acceptable packet delay is based on packet transmission times over a packet-switched network;
a second instruction set for transmitting, by the user equipment, the queued packets during a single wake state of the transceiver to an access point, wherein the second instruction set comprises a third instruction set for transmitting the queued packets during a single acquisition of a channel in the packet-switched network; and
a fourth instruction set for detecting, by the user equipment, one or more lost packets, and
in response to the detecting, adjusting the configurable amount of time to match a bundling interval of the access point.

41. The non-transitory computer-readable medium of claim 40, wherein the packet-switched network comprises a wireless local area network.

42. The non-transitory computer-readable medium of claim 41, further comprising a fifth instruction set for generating a transmission opportunity (TXOP) to transmit the queued packets.

43. The non-transitory computer-readable medium of claim 40, wherein the packets comprise Voice over Internet Protocol (VoIP) packets.

44. The non-transitory computer-readable medium of claim 40, further comprising a fifth instruction set for, after the configurable amount of time has elapsed, switching the transceiver from the suspended state to the wake state to transmit the queued packets.

45. The non-transitory computer-readable medium of claim 40, further comprising a fifth instruction set for receiving, during the single wake state, packets previously queued for transmission to the user equipment.

46. The non-transitory computer-readable medium of claim 40, wherein the user equipment comprises a mobile device and the transceiver comprises a radio.

47. The non-transitory computer-readable medium of claim 40, further comprising a fifth instruction set for assembling a set of the queued packets into a Real-time Transport Protocol/Internet Protocol (RTP/IP) packet, wherein the second instruction set further comprises a sixth instruction set for transmitting the RTP/IP packet.

48. The non-transitory computer-readable medium of claim 47, further comprising a seventh instruction set for, after the configurable amount of time has elapsed, assembling the queued packets in the RTP/IP packet.

* * * * *